United States Patent [19]

Nishida

[11] Patent Number: 5,063,545
[45] Date of Patent: Nov. 5, 1991

[54] ACCESS SPEED DETECTING MEANS FOR DISC PLAYER

[75] Inventor: Norio Nishida, Kanagawa, Japan

[73] Assignee: Sony Corporation, Tokyo, Japan

[21] Appl. No.: 446,443

[22] Filed: Dec. 5, 1989

[30] Foreign Application Priority Data

Dec. 8, 1988 [JP] Japan .................................. 63-310568

[51] Int. Cl.[5] ................................................ G11B 7/00
[52] U.S. Cl. ........................................................ 369/32
[58] Field of Search ..................... 369/32, 44.28, 44.34, 369/44.35, 44.29; 360/78.04, 78.05; 358/907

[56] References Cited

U.S. PATENT DOCUMENTS 4,627,038 12/1986 Abed et al. .
4,788,421 11/1988 Ogawa et al. .
4,866,687 9/1989 Kasai et al. ............................. 369/32
4,884,259 11/1989 Horikawa et al. ..................... 369/32

FOREIGN PATENT DOCUMENTS 277793 8/1988 European Pat. Off. .
277799 8/1988 European Pat. Off. .

*Primary Examiner*—Robert L. Richardson
*Attorney, Agent, or Firm*—Alvin Sinderbrand; William S. Frommer

[57] ABSTRACT

Apparatus for detecting the speed with which a light beam emitted by an optical head accesses a target record track on an optical disc in which record track traverse data indicating track number are recorded previously. The traverse data is read and traverse data signals indicative of the scanning position of the light beam are produced. Deviations in the traverse data signals obtained at predetermined time intervals are detected to form upper order data bits representing access speed. At the same time, tracking error data signals proportionate to the deviation of the light beam from a record track on the disc are produced and a deviation in the tracking error data signals is detected to form the lower data bits of the access speed.

14 Claims, 10 Drawing Sheets

ACCESS SPEED DETECTING MEANS FOR DISC PLAYER

FIELD OF THE INVENTION

This invention relates to a method and an apparatus for determining the access speed of an optical head whose light beam scans the recording surface of an optical disc having a large number of recording tracks formed thereon and, more particularly, to such method and apparatus which use pre-recorded traverse data and tracking error data to determine the access speed.

PRIOR ART

Recently, optical disc apparatus which utilize either optical or photo-magnetic signal recording/reproducing techniques have been developed and offered to the market. This disc apparatus may be used as a read only memory (or ROM type disc), as a so-called write once read many times (WORM) disc, or as a so-called erasable or rewritable recording medium, such as a magneto-optical disc, on which data can be rewritten as desired.

In such optical disc recording/reproducing apparatus, the optical disc is rotated under servo control either at a constant angular velocity or at a variable angular velocity to produce constant linear velocity. The record tracks of the optical disc are scanned by a light beam, such as a laser beam emitted by a laser diode for data recording and/or reproduction. Focusing and tracking servo control of the optical head tend to scan the proper tracks for recording or reproducing data.

In this type of disc recording/reproducing apparatus, when shifting the optical head to a target record track position, that is, when accessing a desired track, the velocity v of the optical head usually is controlled to comply with a preferred trajectory so that a predetermined reference velocity $V_R$ is reached at some distance between the current track position x of the light beam and the target track position $P_A$, as shown graphically in FIG. 1. The velocity v of the optical head is customarily detected by, for example, a speed sensor fixed to a chassis of the apparatus.

One proposal for achieving a common recording format for a variety of optical discs, relies upon a so-called sampled servo technique, similar to the so-called sector servo technique used with hard magnetic discs in which servo signals are prerecorded (or pre-formatted), as clock pits or tracking pits (information typically is recorded on optical discs in the form of pits and lands) at predetermined intervals or angles in each track. These discrete servo signals are sampled and held during disc rotation to effect continuous servo control. One example of this type of optical disc is shown as disc 1 having the recording format illustrated in FIG. 2 and rotatable in direction r for recording and/or reproducing data.

An annular label section 3 (on which an identifying label may be attached) is provided about a central aperture 2 of disc 1, and an annular recording section 4 is provided about the label section. A spirally extending recording track tk is formed in recording section 4 surrounding central aperture 2 and contains a large number of turns. Each turn (or, as referred to hereafter, each track) is divided into m sectors $sc_1, sc_2, \ldots, sc_m$, m being, for example, equal to 32. As illustrated, the sectors are in radial alignment from one track to the next, and such aligned sectors bear the same suffix numerals, such as $sc_1$, from track to track.

Each sector $sc_1, sc_2, \ldots, sc_m$ of each track has an address data section ad at its leading end followed by a predetermined number n of blocks $bl_1, bl_2, \ldots, bl_n$, arrayed along the recording track, wherein n may, for example, be 43. Like the sectors, the blocks are in radial alignment from one track to the next. Each of blocks $bl_1, bl_2, \ldots, bl_n$ in each sector contains a control record region $ar_c$, at its leading end, followed by a data writing region $ar_D$ to constitute a unit record domain. In control record region arc of each block, tracking indicia, referred to as tracking data pits $q_a$ and $q_b$, are radially offset on either side of a track center line kc. These tracking data pits are pre-recorded with a predetermined distance from one another. In addition, a clock data pit $q_c$ is pre-recorded on center line kc. As regards the arraying of the tracking data pits $q_a$ and $q_b$ and the clock data pits $q_c$ in the directions normal to the track center lines kc, that is, in the radial directions of the disc 1, the tracking data pits $q_b$ and the clock data pits $q_c$ of the several tracks are disposed on respective straight radial lines, whereas the tracking data pits $q_a$ are disposed at different radial lines relative to, for example, clock data pit $q_c$, so as to be offset by one radial position, that is, offset in the directions along the tracks, every sixteen tracks, as shown in FIG. 3.

In use, the tracking data pits $q_a$ and $q_b$ and the clock data pits $q_c$ in the control record region $ar_c$ of disc 1 are read out by an optical beam to provide information for various servo control operations and for clock generation. That is, timing clock signals are derived from the clock data pits $q_c$, and tracking errors are derived from the tracking data pits $q_a$ and $q_b$. In addition, beam focusing control is carried out as a function of the reproduced output upon scanning of a mirror surface region of disc 1, that is, a region free of tracking or clock data pits. By sensing the offset position of a tracking data pit $q_a$, the track number of the track currently scanned by the optical pickup may be determined.

In general, an optical disc suffers from eccentricities, such that the absolute position of the target track is shifted relative to the light beam as the disc rotates. Thus, the velocity of the optical disc, detected by a speed sensor provided on the chassis, may not be indicative of the velocity with which the light spot moves along the disc. Consequently, it is desirable to detect the velocity of the light spot on the optical disc.

Basic sampling theorem requires that the sampling frequency be at least twice the highest frequency of the signal being sampled. Hence, when using a sampled servo system, track traversing cannot be detected unless the light spot traverses each track (so as to read the data pits) during a time interval not less than twice the sampling period. Consequently, velocity during high-speed movement cannot be readily detected by a sampled servo system.

The offset of tracking data pits $q_a$ by one unit every 16 tracks in disc 1 may be utilized for traverse counting of the tracks by units of 16. This traverse data can be used to detect beam speed during high speed movement. However, during low speed movement, phase lag may be introduced due to idle time and holding time, such that speed detection may not be realized with the desired high accuracy.

For example, consider the actual velocity $v_0$ of the light spot during deceleration and the velocity $v_d$ detected from the traverse data, that is, from offset of tracking data pits $q_a$. As shown in FIG. 4, the mean velocity for movement between point A and point C (separated by 16 tracks) may be determined from the measured value of the time lapse between the points A and C. This mean velocity is equal to the true velocity $v_0$ at a point B which leads point A by $T_{k-1}/2$, wherein $T_{k-1}$ is the interval for moving the light spot from point A to point C. This speed value is determined at the point C after a lapse of idle time $T_{82\ (k-1)}T_{\mu(k-1)}=T_{k-1}/2$ and is held until the point D (which leads the point C by 16 tracks) is reached by the spot. At point D, an error equal to $V_k$ is present between the true velocity $V_0$ and the velocity $v_d$ detected from the traverse data. The time lapse between the points B and D represents the phase lag.

During the time interval $T_k$, the light spot advances a distance equal to 16 consecutive tracks. When the speed of movement of the light spot is reduced, the time interval $T_k$ increases and the error in speed detection also increases, such that when the target track is reached, the speed of the light spot is not equal to zero but undergoes a significant overshoot. Likewise, for a 1-track access (or seek) at a lower speed of movement, the mean velocity of the light spot cannot be detected during the time that the spot advances only one track. Furthermore, since the tracking error signal usually is non-linear, as shown in FIG. 5, when differentiated it will not provide a speed signal. The same difficulties are found in the use of a continuous servo.

Thus, conventional optical disc recording/reproducing apparatus suffers from the drawback that the light spot access speed cannot be detected with high accuracy when the optical head moves to a target recording track. Consequently, the target track cannot be reached simply by a single access operation and, hence, the access time is unduly prolonged.

OBJECTS AND SUMMARY OF THE INVENTION

Therefore, it is an object of the present invention to provide optical disc recording/reproducing apparatus wherein an optical head may be moved to a target track position to effect prompt and reliable data recording on and/or reproduction from the target track.

It is another object of the present invention to provide apparatus for accurately detecting the speed at which a light beam accesses a target recording track on an optical disc.

An additional object of this invention is to provide apparatus for detecting the position of a light beam between tracks on an optical disc by sensing tracking error data reproduced from a track even when the light beam traverses that track at a speed such that the frequency of the reproduced tracking error data is greater than half the frequency at which that data is sampled.

In accordance with the present invention, an optical disc has traverse data indicating a large number of recording tracks pre-recorded on its recording surface, which is scanned by the light beam of an optical head. The traverse data is detected and deviations therein which are detected at predetermined time intervals are used to form upper order data bits representing access speed. Pre-recorded tracking error data is scanned by the light beam and used to detect deviations in the light spot from a recording track, and deviations in the tracking error are used to form lower order data bits representing the access speed. Thus, the speed at which the optical head accesses the optical disc may be detected from the pre-recorded traverse data and tracking error data.

Although the tracking error detected by the light beam is non-linear and, if differentiated, will not produce velocity data, nevertheless the light spot position can be determined, even when the light spot is between adjacent tracks. Thus, even when the light spot traverse, a given track at a low velocity such that the frequency of the detected tracking error data is not less than one half the sampling frequency, the velocity of the light spot can be determined.

BRIEF DESCRIPTION OF THE DRAWINGS

The following detailed description, given by way of example, and not intended that the invention should be limited solely thereto, will best be understood in conjunction with the accompanying drawings, in which.

DETAILED DESCRIPTION OF A PREFERRED EMBODIMENT

Figure 1:
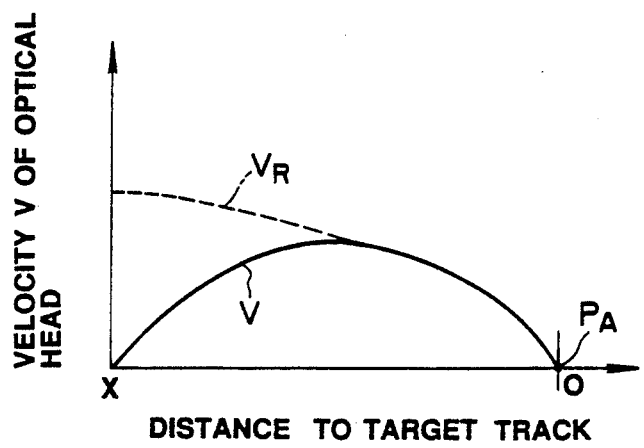
FIG. 1 is a graphical representation of a conventional optical head feed control operation for accessing a target record track.
Figure 2:
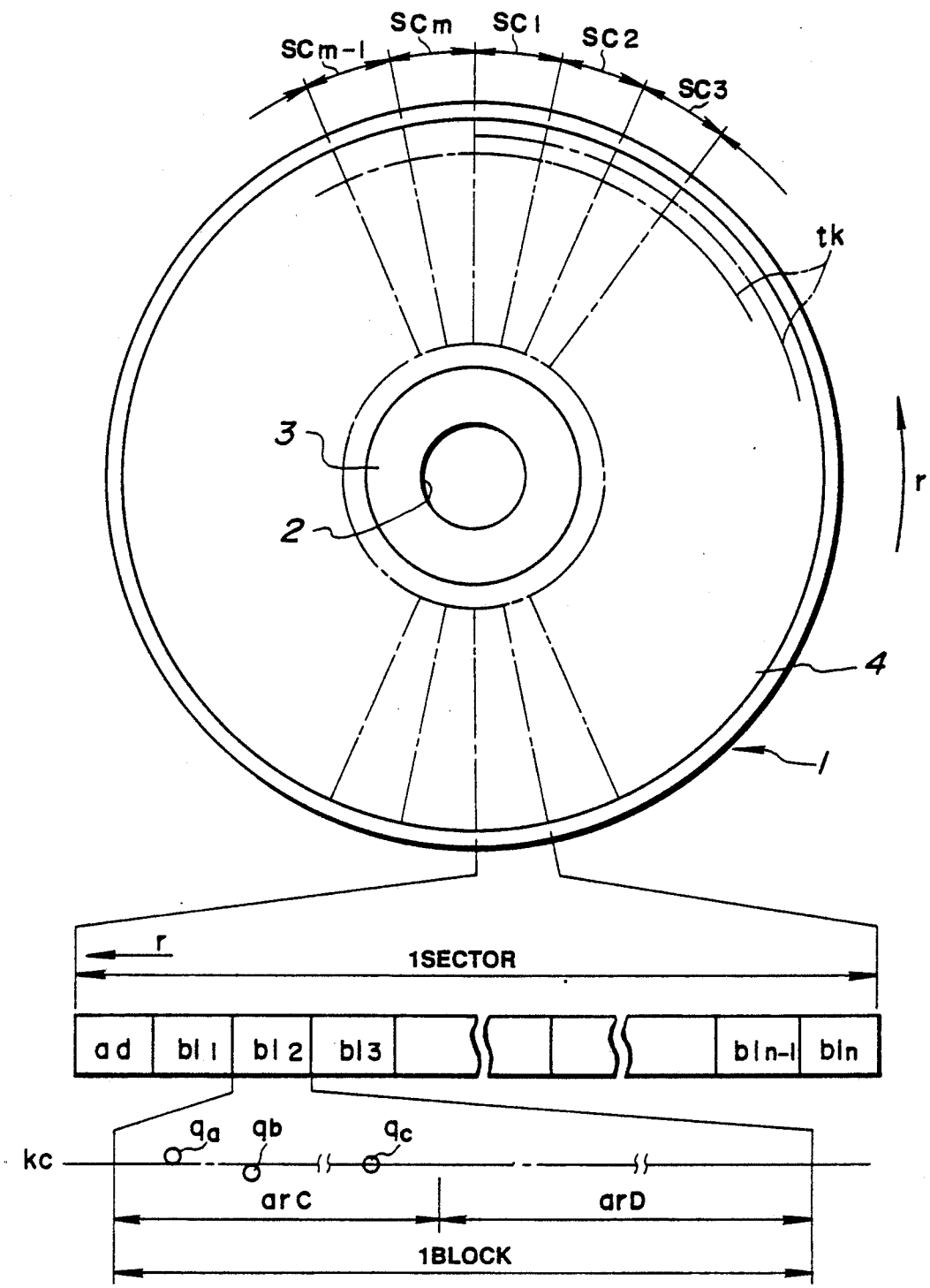
FIG. 2 is a schematic view of the recording format of an optical disc with sampled servo.
Figure 3:
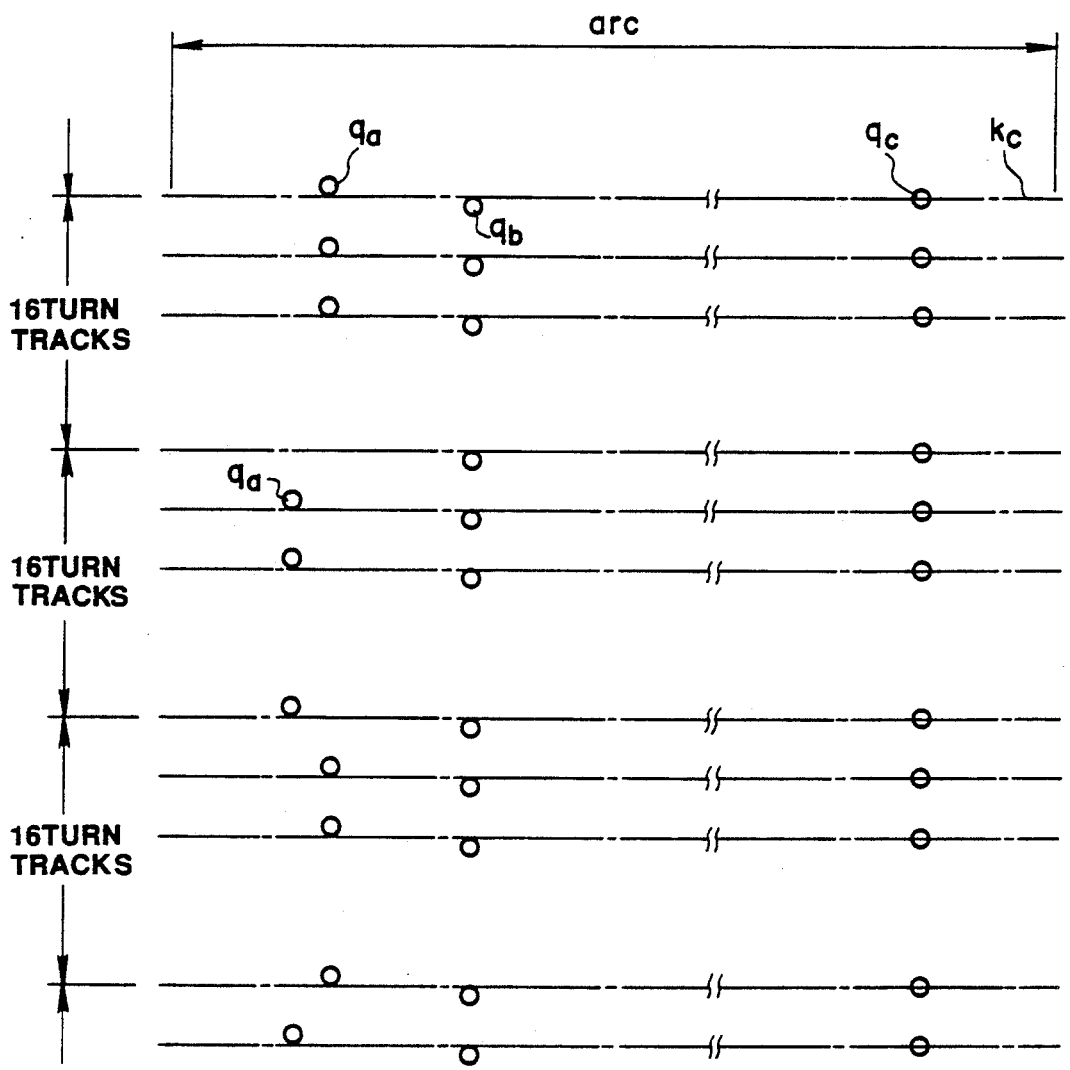
FIG. 3 is a schematic view of the pit array in the control record region of an optical disc.
Figure 4:
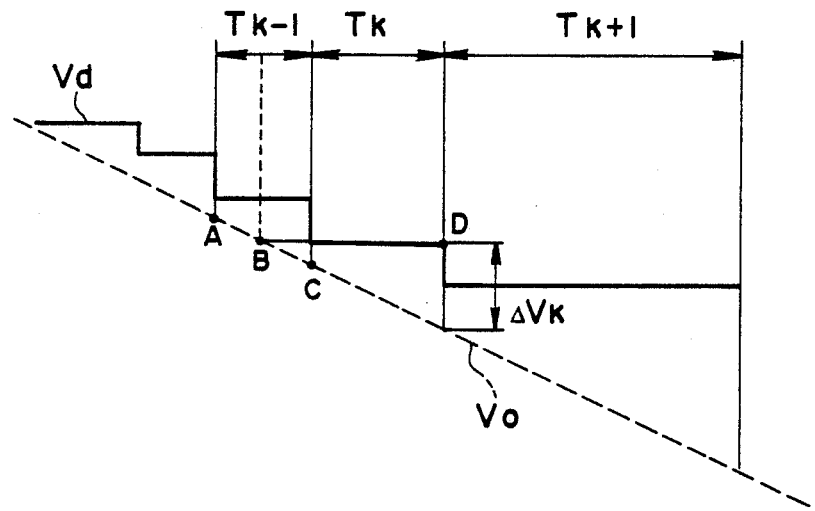
FIG. 4 is a graph that is helpful in explaining the errors in the head feed control operation when the optical disc is accessed.
Figure 5:
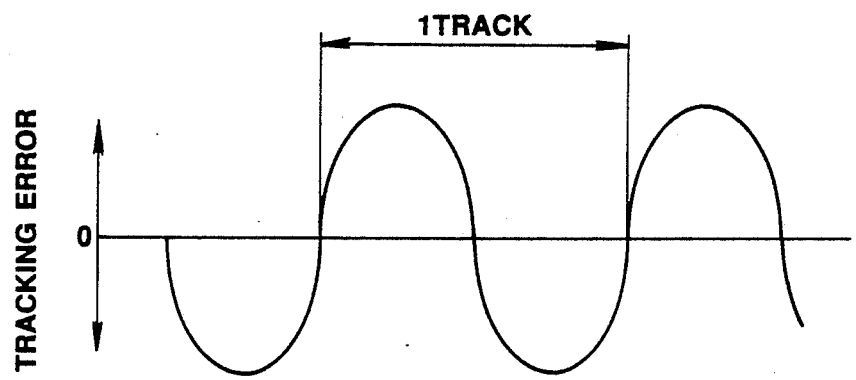
FIG. 5 is a graphical representation of head tracking errors.
Figure 6:
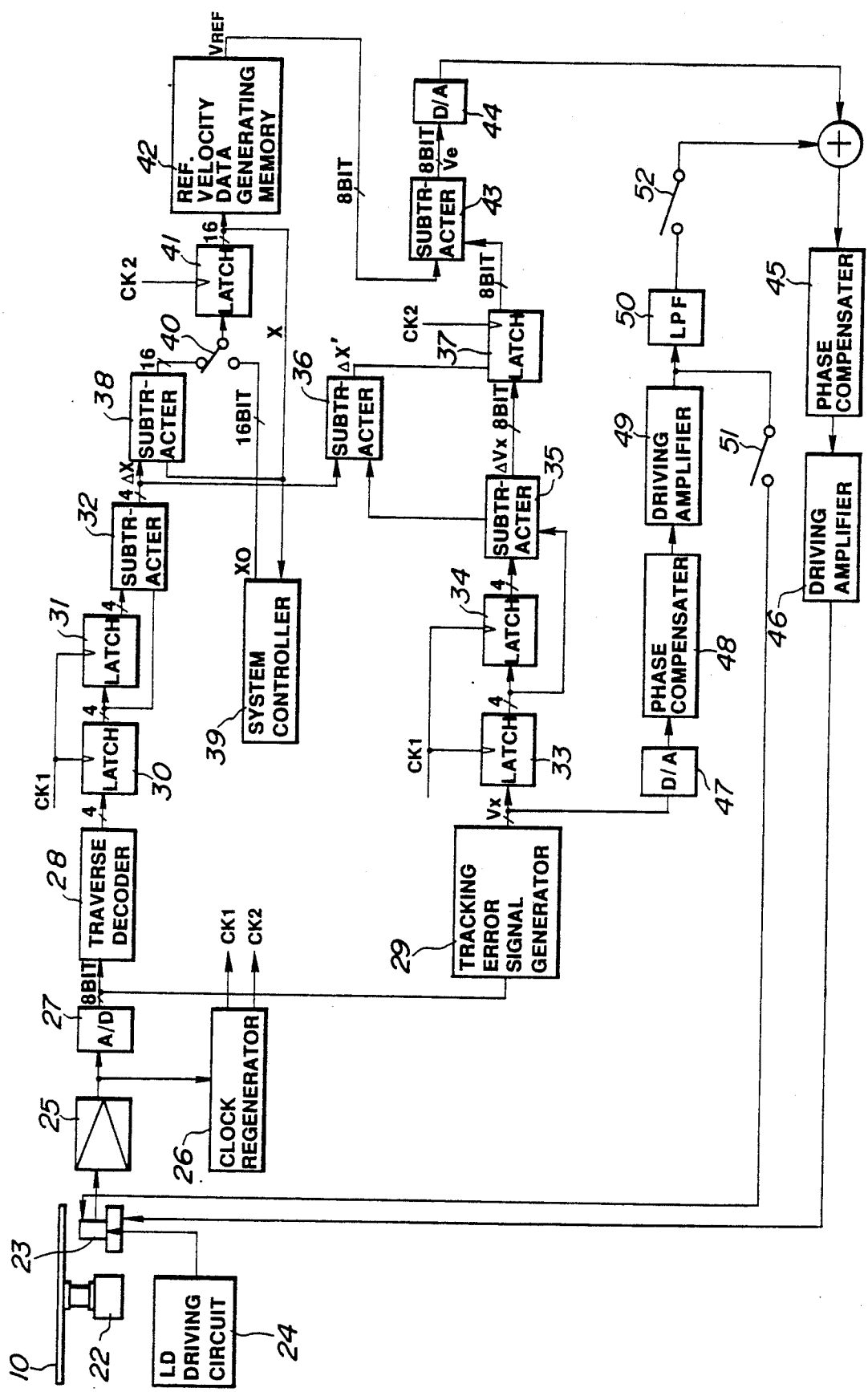
FIG. 6 is a block diagram of a servo system for optical head recording/reproducing apparatus embodying the present invention.
Figure 7:
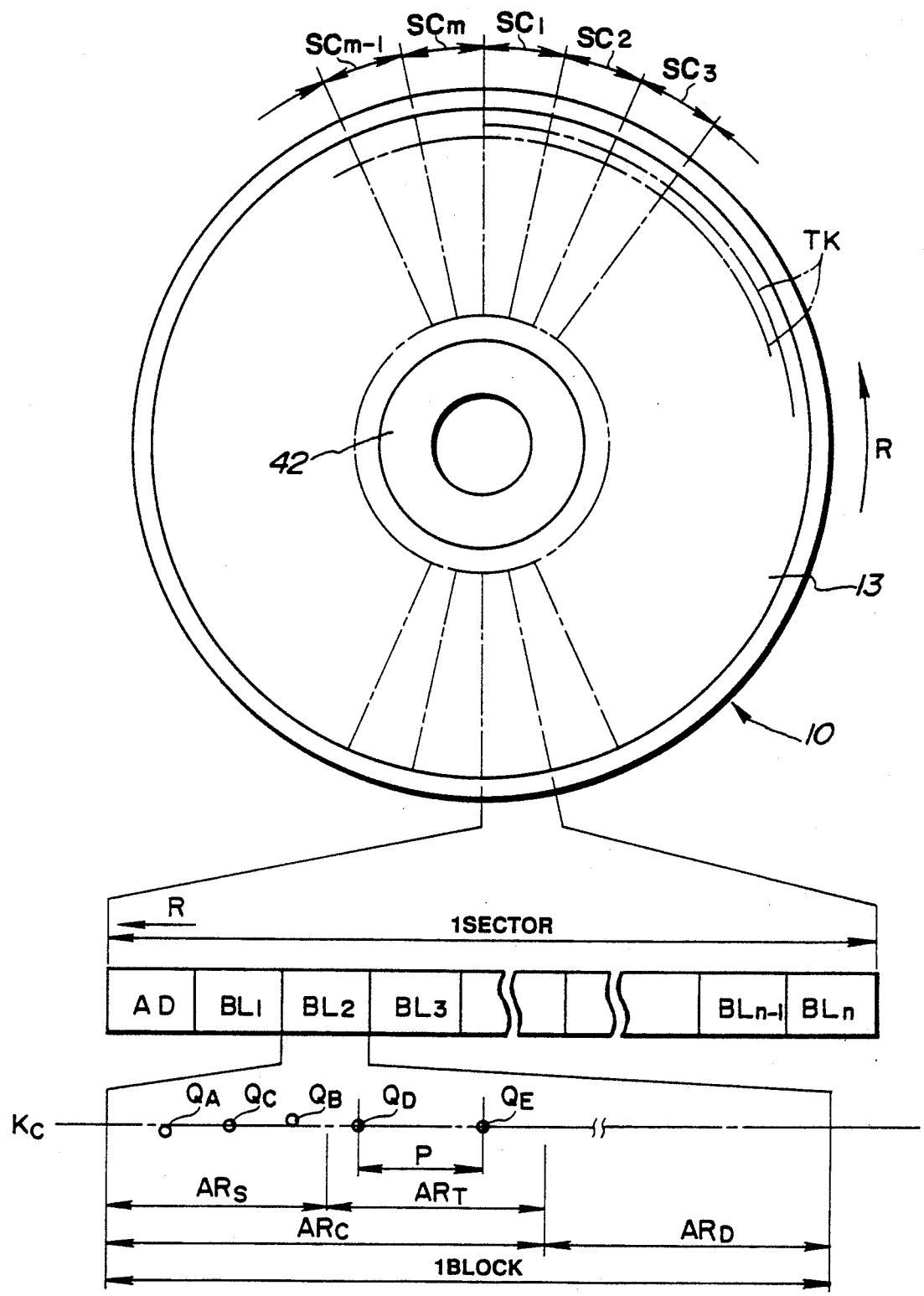
FIG. 7 is a schematic view of the recording format of the optical disc employed in the recording/reproducing apparatus shown in FIG. 6.
Figure 8:
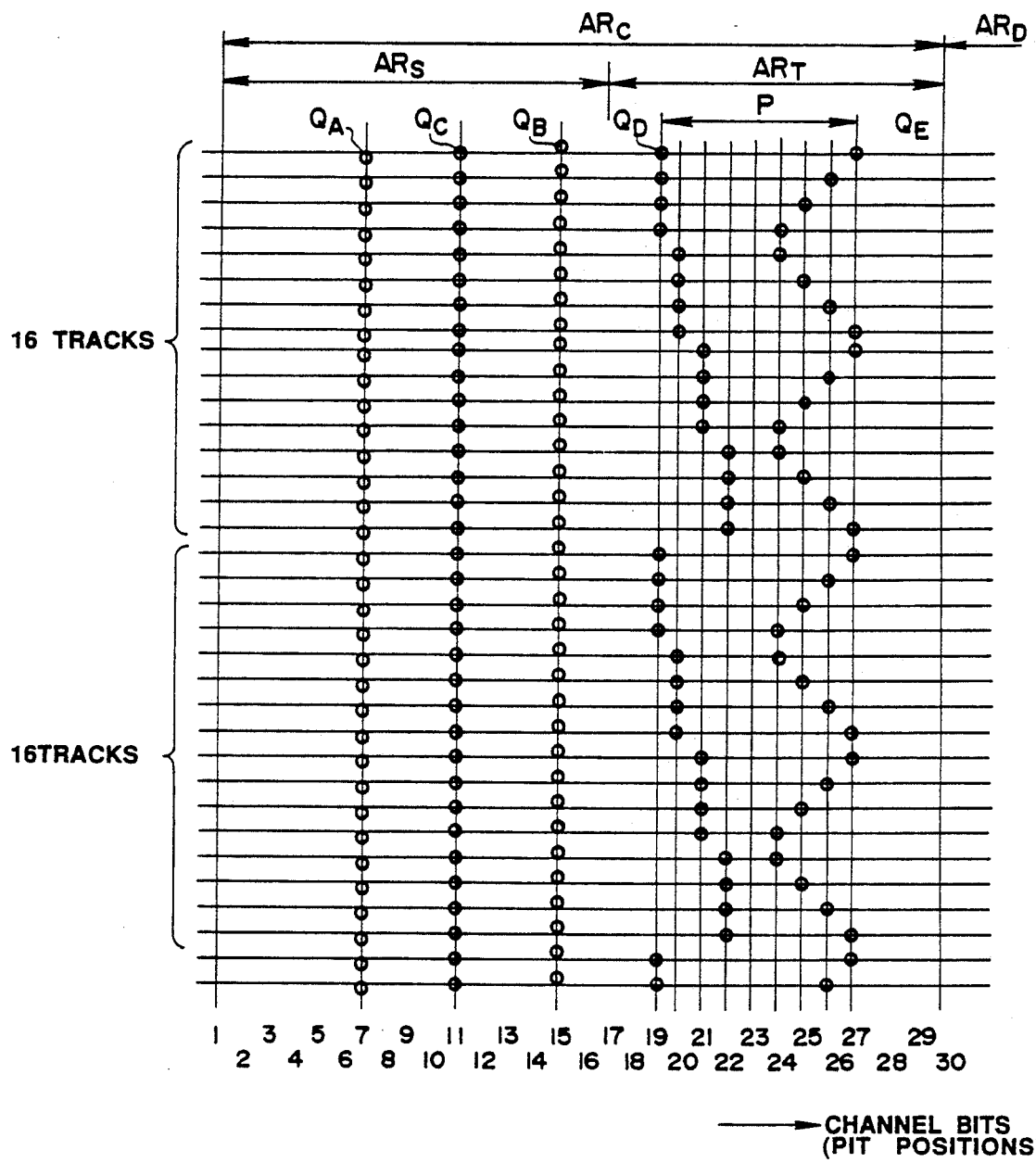
FIG. 8 is a schematic view of the pit array in the control record region of the optical disc shown in FIG. 7.

Referring to the drawings, an illustrative embodiment of the present invention is represented by the block diagram shown in FIG. 6. The illustrated servo system is applied to an optical disc recording/reproducing apparatus in which an optical disc 10 having a recording format proposed by copending U.S. application Ser. No. 348,486, filed on Apr. 18, 1989, and now U.S. Pat. No. 4,925,717 shown herein in FIGS. 7 and 8, is employed as the recording medium.

Optical disc 10 includes an annular label section 42 provided about a central aperture and an annular recording section 13 provided about the label section 42. Recording section 13 contains a spirally extending recording track TK formed with a large number of turns (or tracks), each of which is divided into m sectors $sc_1$, sc$_2$, ..., sc$_m$, m being, for example, equal to 32. The sectors are in radial alignment from track to track, with radially aligned sectors bearing the same suffix numerals, such as sc$_1$. Each of sectors sc$_1$, sc$_2$, ..., sc$_m$ of each turn (or track) has an address data section Ad at its leading end, followed by a predetermined number n of blocks bl$_1$, bl$_2$, ..., bl$_n$, arrayed along the recording track, wherein n may be, for example, 43. The blocks are in radial alignment from track to track, similar to the sectors. As shown in FIG. 7, each block includes a control record region Ar$_C$, at its leading end, followed by a data writing region AR$_D$, to constitute a recording domain unit.

The control record region AR$_C$ of each block is divided into a servo region AR$_S$ and a traverse region AR$_T$. The servo region AR$_S$ contains a pair of tracking data pits q$_a$ and q$_b$ spaced apart by a predetermined distance in the direction of the track corresponding to, for example, 8 bit intervals, and radially offset from each other by one quarter of a track pitch on either side of a track center line K$_C$. A clock data pit Q$_C$ is positioned intermediate the tracking data pits Q$_A$ and Q$_B$ on the track centerline K$_C$. The traverse region AR$_T$ contains a pair of traverse data pits Q$_D$ and Q$_E$ spaced apart from each other by a distance P which varies from track to track and is specified or predetermined for each recording track, with clock data pit Q$_C$ as the reference. This is best illustrated in FIG. 8.

The control record region AR$_C$ has a data recording capacity of 30 bits, of which the 7th and the 15th bits are the recording positions allotted for the tracking data pits Q$_A$ and Q$_B$, respectively, the 11th bit is the recording position allotted for the clock data pit Q$_C$ and the 19th to 27th bits are the recording positions allotted for the traverse data pits Q$_D$ and Q$_E$. The tracking data pits Q$_A$ and Q$_B$ and the clock data pits Q$_C$ are in radial alignment from track to track on respective radial lines, as shown in FIG. 8; whereas the traverse data pits Q$_D$ are shifted in the track direction by one bit interval for every four consecutive tracks and the traverse data pits Q$_E$ are shifted in the track direction by one bit interval for each track, except at the track that the traverse data pit Q$_D$ first is shifted. Thus, the traverse data pits present different bit patterns from track to track, and this pattern repeats after 16 tracks. Accordingly, 16 consecutive tracks may be thought of as one unit.

Figure 9:
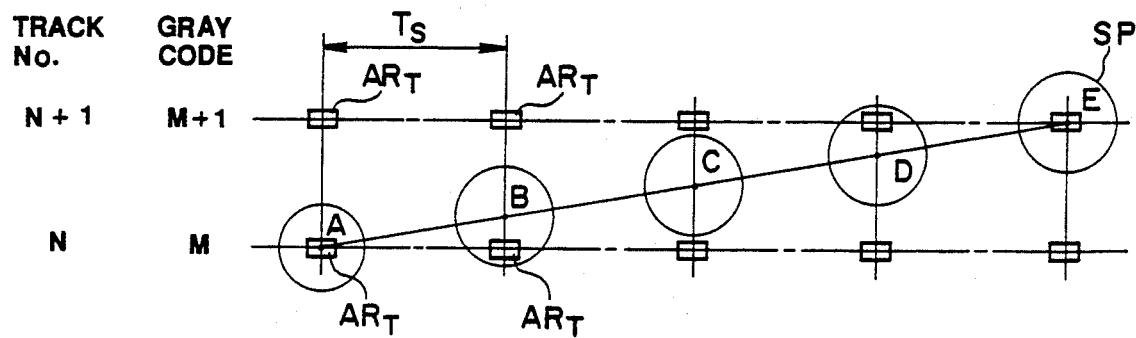
FIG. 9 is a schematic representation that is helpful in explaining how the traverse data provided by the traverse data pits formed in the traverse region of the optical disc is detected.

Track-by-track traverse data, representing the track number and, thus, the position of a scanning beam, may be produced by detecting the traverse data pits Q$_D$ and Q$_E$ read from optical dic 10. The bit pattern of the traverse data pits Q$_D$, Q$_E$ is read under stable tracking control by using the tracking data pits Q$_A$ and Q$_B$ and by deriving clock signals from the clock data pits Q$_C$ to perform highly accurate traverse (or track) counting of the record tracks on a track-by-track basis. For example, and as shown in FIG. 9, when a light spot SP projected by the optical head is moved from a point A to a point E, traverse data M indicating the Nth track is detected at point A and also at point B by reading the traverse data pits Q$_D$ and Q$_E$ from the traverse region AR$_T$. When the light spot reaches point D, traverse data M+1 indicating the (N+1)th track is detected by reading the traverse data pits Q$_D$ and Q$_E$, and this traverse data M+1 also is detected at point E. Hence, stepped traverse data T$_r$ is produced as the light spot traverses successive tracks, as shown in FIG. 10.

Tracking error data representing tracking errors of the light spot in the track pitch direction for each recording track is produced by detecting the tracking data pits Q$_A$ and Q$_B$. Accordingly, the position of the light spot at points B, C and D between the tracks may be derived from this tracking error data. It is recognized that these tracking error data are non-linear and, hence, will not represent speed on differentiation. However, by producing tracking error data proportionate to the deviation in the light spot from the recording track, as in the case of the tracking servo system shown, for example, in copending Japanese Patent Publication 63-181179, the position of the light spot between the tracks can be ascertained even when the light spot traverses the track at a velocity such that the frequency of the tracking error data exceeds one half the sampling frequency.

Figure 10:
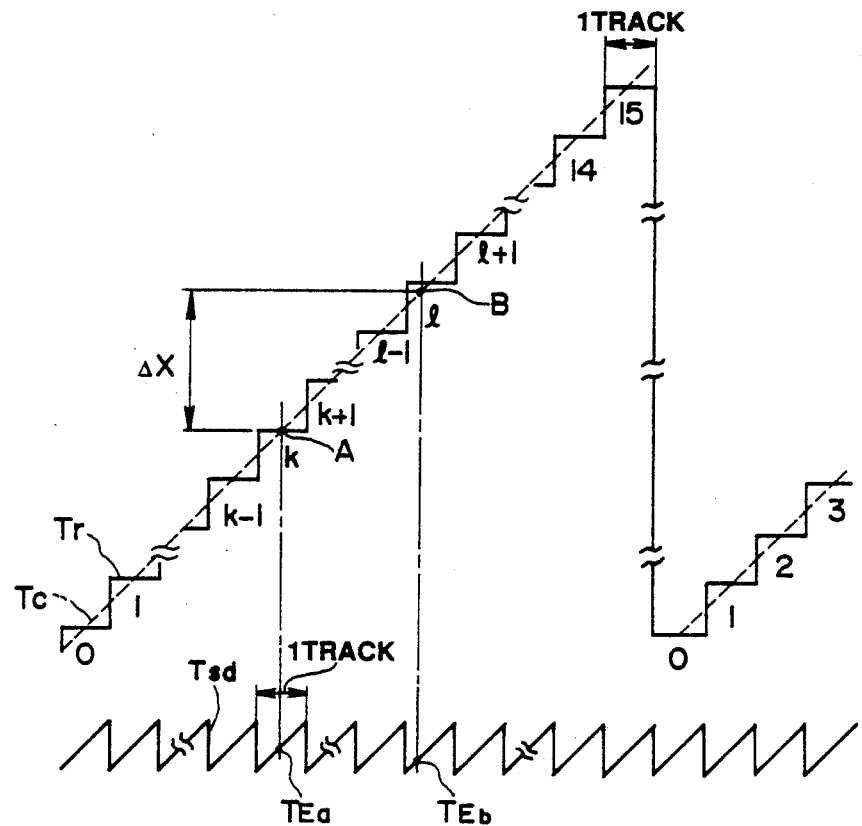
FIG. 10 is a graph helpful in explaining the operating principle of the present invention.

Therefore, as shown, for example, in FIG. 10, the above-mentioned track-wise stepped traverse data T$_r$ may be interpolated with tracking error data T$_{sd}$ (shown as a serrated waveform) proportionate to the deviation of the light spot from a record track TK to produce data T$_C$ representing the continuous positions of the light spot SP, as shown by the broken line in FIG. 10. If it is assumed that the traverse data T$_r$ at point A is k, where $0 \leq k \leq 15$, and the position of the light spot between adjacent tracks is T$_{EA}$, where $-128 \leq T_{Ea} \leq 127$; and the traverse data T$_r$ at the next sampling point B is l, where $0 \leq l \leq 15$, and the position of the light spot between adjacent tracks is T$_{Eb}$, where $-128 \leq T_{Eb} \leq 127$, then the distance $\Delta x$ from point A to point B may be represented as:

$$\Delta x = (l-k) \cdot T_p + (T_{Eb} - T_{Ea}) \cdot T_p / 256 \quad (1)$$

where T$_p$ denotes the track pitch. The mean velocity v of the light spot travelling this distance $\Delta x$ during a sampling period T$_s$ is determined when the light spot reaches point B and may be expressed as:

$$v = \Delta x / T_S \quad (2)$$

Since the track pitch T$_p$ and the sampling period T$_S$ are constant values, the mean velocity v is determined by measuring only the parameters l, k, T$_{Eb}$ and T$_{Ea}$.

Referring now to FIG. 6, there is illustrated an embodiment of a servo system for an optical disc recording/reproducing apparatus which employs optical disc 10 having the recording format shown in FIGS. 7 and 8. A spindle motor 22 drives optical disc 10 under servo control so as to rotate the disc at a constant angular velocity. An optical head 23 includes a laser diode driven by a laser driving circuit 24 to emit a laser light beam, a biaxial actuator, an objective lens for converging the laser light spot onto a record track on the optical disc 10, and a photodetector for detecting modulated light reflected from the disc. The photodetector output is supplied as an RF playback signal to a clock regenerating circuit 26 and to an analog-to-digital (A/D) converter 27 by way of an amplifier 25.

Clock regenerating circuit 26 includes a phase lock loop (PLL) for detecting signals derived from the clock data pits Q$_C$ to produce system synchronizing clock pulses as well as latch clock pulses CK1, CK2. A/D converter 27 converts the RF playback signals into, for example, 8 bit digital data which is supplied to a traverse decoder 28 and to a tracking error signal generator 29.

The traverse decoder 28 senses the bit pattern which is derived from the traverse data pits Q$_D$, Q$_E$, for example, the separation between pulses produced by pits $Q_D$ and $Q_E$ is sensed, to produce traverse data indicative of the scanning position of the light spot emitted by optical head 23. From FIG. 8 it is appreciated that traverse data pits $Q_D$ and $Q_E$ exhibit a pattern that changes from track to track and repeats every 16 tracks. Hence, light spot position is represented by 4 bit Gray code data. Thus, when the light spot SP moves from point A to point E in FIG. 9, traverse decoder 28 produces a 4-bit code corresponding to traverse data M indicating the Nth track when points A and B are scanned, and produces a 4-bit code corresponding to traverse data M+1 indicating the (N+1)th track when points D and E are scanned.

The traverse data produced by traverse decoder 28 is latched by a latch circuit 30 in response to latch clock pulses $CK_1$ at each sampling period $T_s$. The traverse data thus latched by latch circuit 30 is shifted into a latch circuit 31 at the next sampling period in response to latch clock pulse $CK_1$. The difference between the traverse data latched by latch circuits 30, 31 is determined by a subtractor 32 to produce the four higher order data bits representing the distance $\Delta x$ through which the light spot has moved during one sampling period $T_s$. Subtractor 32 thus produces coarse distance data.

Tracking error signal generator 29 senses the bit pattern produced by A/D converter 27 in response to the tracking data bits $Q_A$ and $Q_B$ to produce tracking error data Vx proportionate to the deviation of the light spot from the record track TK in the following manner.

Figure 11:
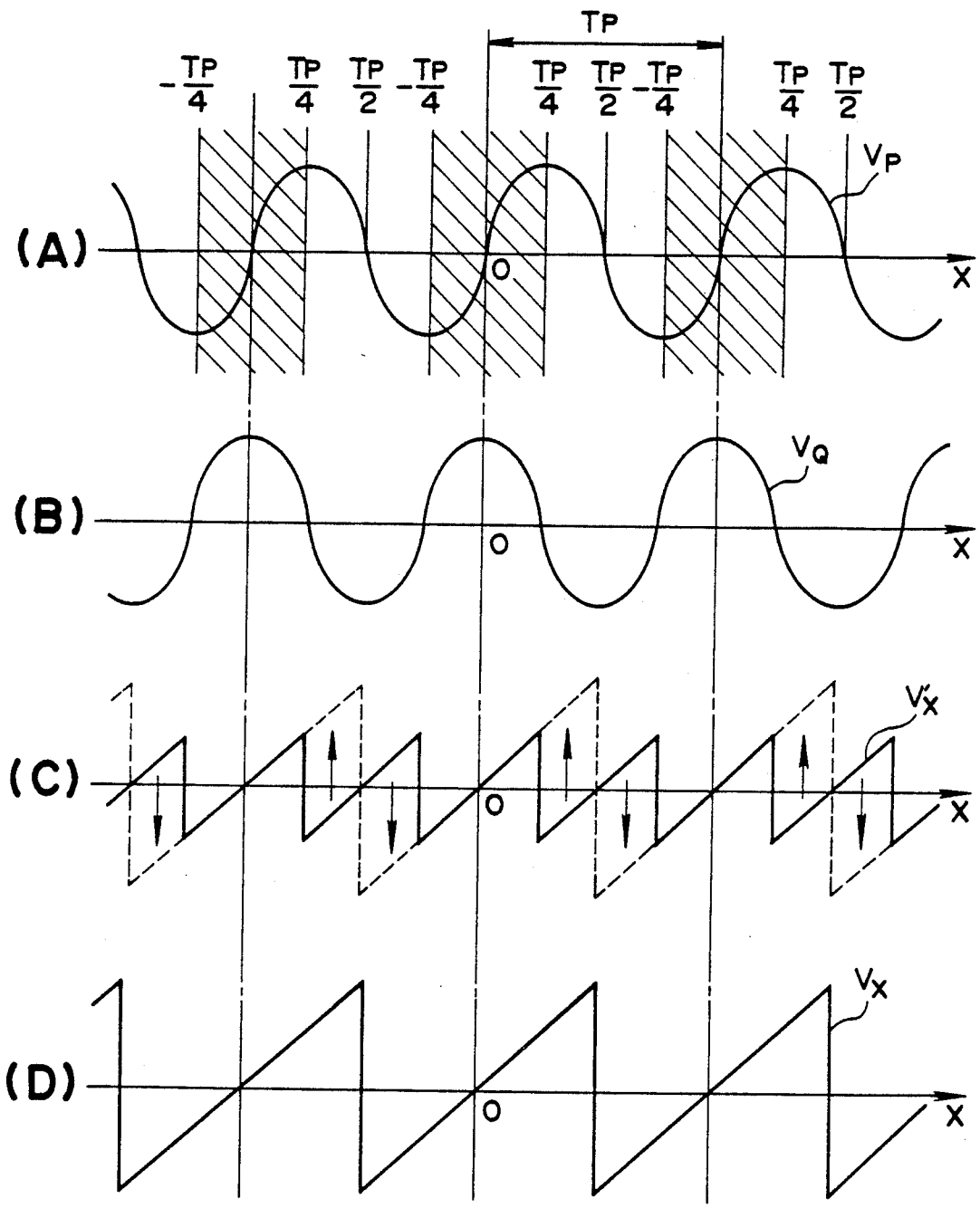
FIGS. 11A–11D are graphs useful in explaining the operating principle for obtaining tracking error data proportionate to the deviation of the scanning light beam from a recording track.

It will be recognized that a sinusoidal tracking error signal Vp, as shown at A in FIG. 11, is obtained by sensing the difference between successively sampled signals derived from the tracking data pits $Q_A$ and $Q_B$. Signal level changes also appear in the clock signals derived from the clock data pits $Q_C$ as a function of the tracking error thereof. That is, as the light spot deviates from the record track, the level of the signal produced from scanning that track decreases. As shown at B in FIG. 11, a level variance $V_Q$ of the output derived from the clock data pits $Q_C$ exhibits a phase difference of 90° with respect to the tracking error signal $V_P$. This conforms with the appreciation of the fact that when the light beam is properly centered on the center line of the track, the difference between the signals derived from tracking data pits $Q_A$ and $Q_B$ is zero and the level of the signal derived from the clock data pits $Q_C$ is a maximum. Thus, if $$V_Q = A\cos\left(2\pi \frac{x}{P}\right) \quad (3)$$

then, since $$\frac{V_P}{V_Q} = \frac{A\sin(2\pi x/P)}{A\cos(2\pi x/P)}$$
$$= \tan(2\pi x/P)$$

the signal $V_{x'}$, which indicates the deviation x of the light spot from the record track is given by $$V_{x'} = P/2\pi \tan^{-1}(V_P/V_Q) \quad (4)$$

As shown by the solid line at C in FIG. 11, the signal $V_{x'}$ generally is proportionate to the deviation x within the range of $|x| < T_P/4$; however, it is discontinuous at $|x| = T_P/4$. Thus, by level shifting the signal $V_{x'}$ within the range of $T_P/4 \leq |x| < T_P/2$ in the direction represented by the arrow S, as shown by the broken line in FIG. 11C, the tracking error signal $V_x$ may be made proportionate to the deviation x within the range of $|x| < T_P/2$, as shown at D in FIG. 11.

Tracking error signal generator 29 includes a memory which stores a conversion table for the 8-bit tracking error data $V_x$ in accordance with equation (4), above, and the aforementioned level shifting operation. The tracking error data $V_x$ thus obtained from tracking error signal generator 29 is latched by a latch circuit 33 at each sampling period $T_s$ in response to latch clock pulse $CK_1$. The tracking error data thus latched by latch circuit 33 is shifted into latch circuit 34 at the next sampling period in response to latch clock $CK_1$. Differential data $\Delta V_x$ between the tracking error data latched by latch circuits 33, 34 is determined by a subtracter 35 coupled thereto. The thus computed differential data $\Delta V_x$ is used as the eight lower order data bits representing the distance $\Delta x$ through which the light spot has moved during one sampling period $T_s$.

If the computed differential data $\Delta V_x$ exhibits a negative value, as may occur as a function of the direction of movement of the light spot, a borrow flag is supplied from subtracter 35 to a subtracter 36 to which the four higher order bits representing distance $\Delta x$ are supplied, so that the distance data $\Delta x$ is corrected in subtracter 36.

The outputs $\Delta V_x$ and $\Delta x'$ from subtracters 35, 36 are supplied to a latch circuit 37, where they are latched at the sampling period Ts in response to latch clock pulse $CK_2$. Distance output $\Delta x'$ is produced after correction in subtracter 36 and forms the 4 upper order data bits and the differential data output $\Delta V_x$ produced by subtracter 35 forms the 8 lower order data bits, resulting in 12-bit speed representing signal which represents the actual speed of the moving lightspot.

Figure 12:
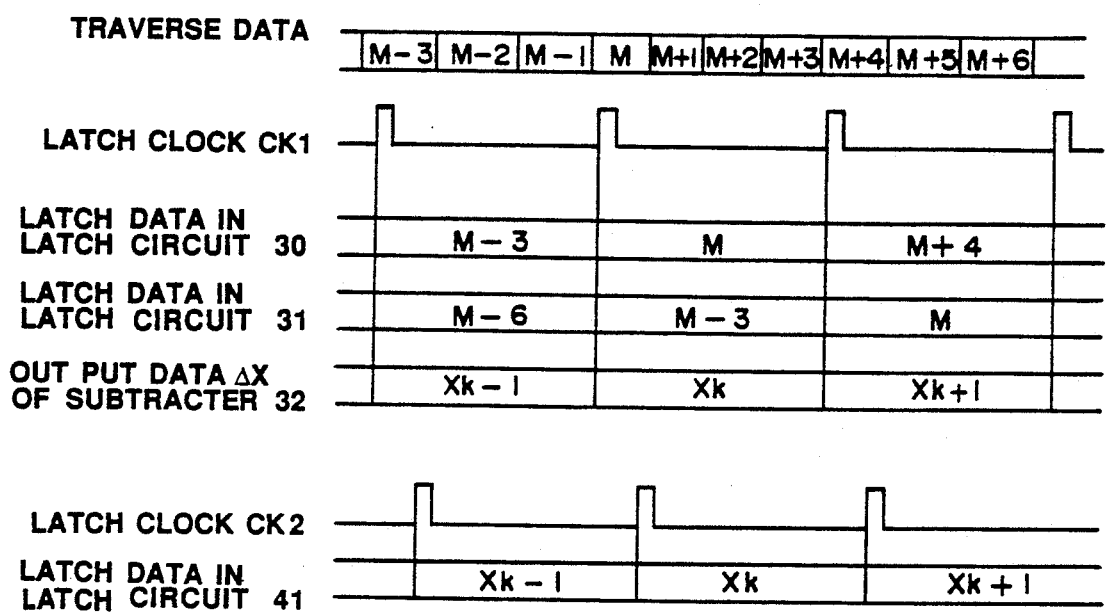
FIG. 12 is a timing diagram useful in explaining the operation of a portion of the servo system of FIG. 6.

It will be noted that latch clock pulse $CK_2$ is delayed, or time lagged, with respect to latch clock pulse $CK_1$ by an amount longer than the computing time of the subtracter, as shown in FIG. 12.

For accessing a target track, a system controller 39 initially is coupled by a changeover switch 40, to a latch circuit 41. At other times, switch 40 couples a subtracter 38 to latch circuit 41. As shown, subtracter 38 is coupled to the output of subtracter 32 which functions to determine the coarse distance data $\Delta x$. Thus, a desired access distance $x_0$ first is loaded into latch circuit 41 from system controller 39. After the light spot begins to move, that is, once accessing begins, subtracter 38 is coupled to latch circuit 41 by changeover switch 40. The coarse distance $\Delta x$ represented by the output of subtracter 32 is subtracted from the distance $x_0$ latched in latch circuit 41 and fed back to subtracter 38. The difference thus produced by subtracter 38 is latched by latch circuit 41 once each sampling period $T_s$ in response to latch clock pulse $CK_2$. This causes the distance x latched in latch circuit 41 to be decremented by $\Delta x$ at each sampling period $T_s$.

An 8-bit reference speed signal $V_{REF}$, corresponding to the distance x stored in latch circuit 41, is read out from a reference speed memory 42 which may include, for example, a lookup table. The 8-bit reference speed signal $V_{REF}$ from memory 42 is supplied to a subtracter 43 where the difference $V_e$ between the 8 upper order data bits of the 12-bit speed representing signal N latched in latch circuit 37 and the reference speed signal $V_{REF}$ is determined. This difference signal represents speed error data. The speed error data $V_e$ determined by subtracter 43 is converted by a digital-to-analog (D/A) converter 44 into corresponding analog signals which are then supplied to a phase compensation circuit 45 and thence to a driving amplifier 46 which drives a motor (not shown) adapted to move optical head 23. Track accessing with speed error data $V_e$ continues until the distance x latched in latch circuit 41 is reduced to zero whereupon the reference speed signal $V_{REF}$ likewise becomes zero. At that time, changeover switch 40 is changed over to couple system controller 39 to latch circuit 41, thereby maintaining the distance value x therein equal to zero. The system controller also closes switches 51, 52 of the servo system.

With switch 51 closed, a tracking servo loop is formed such that a tracking coil, not shown, of the biaxial actuator of optical head 23 is driven by the output of a driving amplifier 49 to which is supplied the tracking error data $V_x$ produced by tracking error signal generator 29. The output of the tracking error signal generator is converted into analog signals by a D/A converter 47 and applied to amplifier 49 by a phase compensation circuit 48. This tracking servo loop operates to drive the light spot from the optical head to follow precisely the accessed record track on the optical disc.

Also, with the switch 52 closed, a low frequency component extracted from the output of driving amplifier 49 by a low pass filter 50 is supplied through phase compensator 45 to driving amplifier 46 which controls the motor that drives optical head 23, thus completing a phase servo loop.

Thus, in accordance with the present invention, any track position on optical disc 10, as well as the speed with which the light spot is moved on the disc, may be detected so that the light spot can be brought to a target track by employing only a single accessing operation despite occurrences of disc eccentricities or similar disturbances.

Although the present invention has been described in conjunction with the preferred embodiment of an optical disc servo system which uses an optical disc having a particular sampled data format, the invention also may be used in the environment of a continuous servo. The present invention also need not be limited to use of a motor for coarse accessing and use of a biaxial actuator for fine accessing.

Various modifications may be made to this invention without departing from the spirit and scope thereof; and the appended claims should be interpreted as including all such modifications and equivalents.

What is claimed is:

1. Apparatus for detecting the speed with which a light beam of an optical head accesses a selected one of several data tracks on an optical disc of the type having recorded in said tracks traverse data representing respective track numbers, said traverse data being read by said optical head, said apparatus comprising:

traverse data detection means for detecting traverse data read from said recording tracks to produce traverse data signals indicative of light beam scanning position;

first speed data forming means for detecting deviations in said traverse data signal produced by said traverse data detection means at predetermined time intervals for forming M upper order data bits representing access speed;

tracking error means for producing tracking error data signals proportionate to a deviation of said light beam from a record track on said optical disc; and second speed data forming means for detecting deviations in said tracking error data signals produced by said tracking error means for forming N lower order data bits representing access speed.

2. The apparatus of claim 1 wherein said first speed data forming means comprises:

clock generating means for generating clock signals;

a first latch circuit responsive to said clock signals for latching said traverse data signals;

a second latch circuit coupled to said first latch circuit and responsive to said clock signals for latching the output of said first latch circuit; and means for determining the difference between the output of said first latch circuit and the output of said second latch circuit, thereby forming said M upper order data bits representing a distance through which said light spot moves during said predetermined time interval.

3. The apparatus of claim 1 wherein said second speed data forming means comprises:

clock generating means for generating clock signals;

a third latch circuit responsive to said clock signal for latching said tracking error data signals;

a fourth latch circuit coupled to said third latch circuit and responsive to said clock signals for latching the output of said third latch circuit; and means for determining the difference between the output of said third latch circuit and the output of said fourth latch circuit, thereby forming said N lower order data bits representing a distance through which said light spot moves during said predetermined time interval.

4. The apparatus of claim 1 further comprising a latch circuit for latching the M and N data bits formed by said first and second speed data forming means, thereby forming (M+N) access speed data bits.

5. The apparatus of claim 4 further comprising subtracting means for subtracting the output of said second speed data forming means from the output of said first speed data forming means if said output of said output of said second speed data forming means is negative, thereby correcting said M data bits before latching in said latch circuit.

6. The apparatus of claim 4 further comprising means for delaying the latching of said M and N data bits by a time delay which is longer than the operating time of said first or second speed data forming means.

7. Apparatus for determining the access speed of a light beam as it access a target record track on an optical disc in which tracking information and track identity information are recorded in each track, said apparatus comprising playback means for playing back said tracking information and said track identity information from said disc; first storage means for storing track identity data derived from said track identity information at first and second sampling times as said light beam traverses record tracks; first subtracting means coupled to said first storage means for obtaining the difference between the track identity data stored at said first and second sampling times to produce a first difference signal providing a coarse representation of a distance moved by said light beam; second storage means for storing tracking error data derived from said tracking information at said fist and second sampling times and representing respective deviations of said light beam from a record track, second subtracting means coupled to said second storage means for obtaining the difference between the tracking error data stored at said first and second sampling times to produce a second difference signal providing a fine representation of said distance moved by said light beam; and combining means for combining the values of said first and second difference signals to produce a speed signal representing the speed at which said light beam moves said distance.

8. The apparatus of claim 7 wherein said first and second sampling times define a time interval over which said distance is measured and said speed is determined.

9. The apparatus of claim 7 wherein said combining means includes correcting means for correcting the value of said first difference signal in the event that said second difference signal provides a fine representation of negative distance.

10. The apparatus of claim 9 wherein said correcting means includes third subtracting means for subtracting the value of said second difference signal from the value of said first difference signal to produce a corrected value of said first difference signal which is combined with the value of said second difference signal to produce said speed signal.

11. The apparatus of claim 10 wherein said combining means comprises a latch circuit for latching the value of said second difference signal and the value of either said first difference signal or said corrected first difference signal, depending upon whether said second difference signal represents positive or negative distance.

12. The apparatus of claim 7 wherein said track identity information is recorded as indicia spaced apart by a predetermined amount thereby to represent a track number.

13. The apparatus of claim 12 wherein the spacing between said indicia is unique for each track within a group of tracks and is repetitive from one group of tracks to the next.

14. A method for detecting the speed with which a light beam of an optical head accesses a selected one of several data tracks on an optical disc in which traverse data representing respective track numbers are recorded, said method comprising:
  reading said traverse data;
  producing traverse data signals representing a scanning position of the light beam in response to the read traverse data;
  detecting deviations in said traverse data signals at predetermined time intervals for forming upper order data bits representing speed;
  sensing light beam tracking positions;
  producing tracking error data signals proportionate to a deviation of said light beam from a recording track in response to a sensed light beam tracking position; and
  detecting deviations in the tracking error data signals at said predetermined time intervals to form lower order data bits representing speed.

* * * * *